United States Patent
Morikiyo et al.

(10) Patent No.: US 6,415,721 B1
(45) Date of Patent: Jul. 9, 2002

(54) STORAGE CONVEYOR FOR HYBRID CARRYING TRUCK

(75) Inventors: Akira Morikiyo; Kenji Umezawa; Zento Tanaka; Masaru Goto, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/541,102

(22) Filed: Mar. 31, 2000

(30) Foreign Application Priority Data

May 14, 1999 (JP) .......................................... 11-133920

(51) Int. Cl.$^7$ .............................................. B61B 13/00
(52) U.S. Cl. ....................................................... 104/137
(58) Field of Search ................................ 104/137, 139, 104/140, 88.01, 96

(56) References Cited

U.S. PATENT DOCUMENTS

| | | | | |
|---|---|---|---|---|
| 4,438,701 A | * | 3/1984 | Murai et al. | 104/172 B |
| 4,548,135 A | * | 10/1985 | Kupczyk | 104/135 |
| 5,014,625 A | * | 5/1991 | Murai et al. | 104/292 |
| 5,195,630 A | * | 3/1993 | Donovan et al. | 198/465.3 |

* cited by examiner

Primary Examiner—S. Joseph Morano
Assistant Examiner—Robert J. McCarry, Jr.
(74) Attorney, Agent, or Firm—Howson & Howson

(57) ABSTRACT

A storage conveyor for a hybrid carrying truck is disclosed wherein construction of a carrying line at a site can be achieved simply and at a low cost without precise construction and smooth carrying and easy transfer between adjacent carrying apparatus of different types from each other can be achieved. The storage conveyor for a hybrid carrying truck carries a hybrid carrying truck which includes a pair of left and right skid members and two pairs of traveling wheels disposed at front and rear positions on the left and right sides thereof, and includes a plurality of conveyor units connected to each other in a carrying direction. Each conveyor unit includes a pair of rails for contacting with the traveling wheels of the hybrid carrying truck, a standard-length connection beam member for connecting the pair of rails to each other in a spaced relationship by a predetermined distance from each other, and a drive roller apparatus securely mounted on the standard-length connection beam member for contacting with one or both of the skid members to transmit propelling force to the hybrid carrying truck.

5 Claims, 9 Drawing Sheets

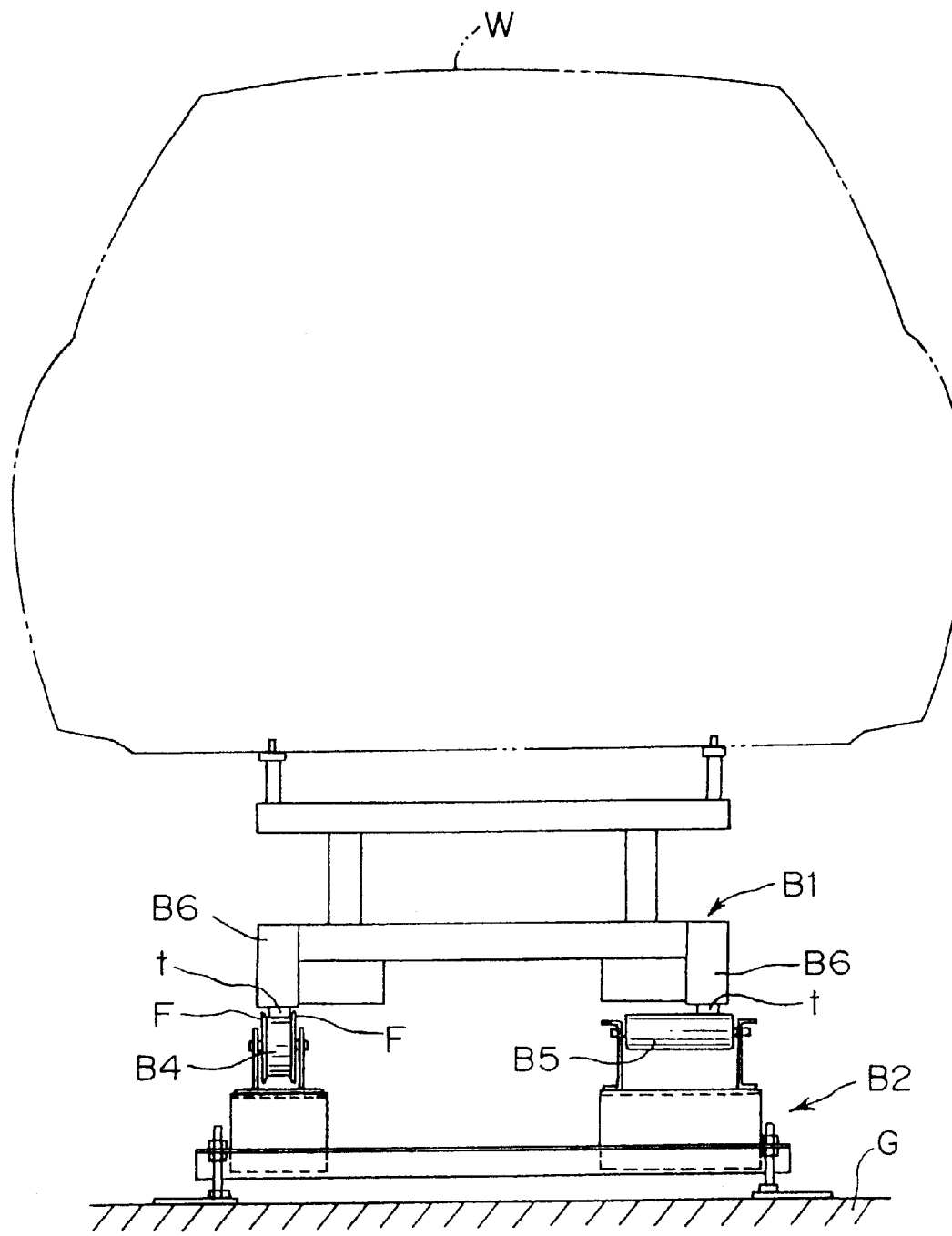

STORAGE CONVEYOR FOR HYBRID CARRYING TRUCK

BACKGROUND OF THE INVENTION

1. Field of the Invention

This invention relates to a storage conveyor for a carrying truck for transporting a work such as a body of an automobile in a factory.

2. Description of the Related Art

Conventionally, in order to carry, in a factory, a carrier such as a carrying truck or a skid carrier on which a work such as a body of an automobile is loaded, various conveyors are used in accordance with a type of a carrier.

FIG. 7 shows an example of a conveyor for a carrying truck for receiving a work W such as a body of an automobile and carrying the work in an oven in order to dry the work W after the work W is painted in a painting step. Referring to FIG. 7, a carrying truck A1 has four flanged traveling wheels A2 on a lower face of a body thereof. The traveling wheels A2 are supported on a pair of rails A4 secured to a support frame A3 on a floor face G in the oven and hauled by a truck carrying conveyor A5 provided between the rails A4 to carry the work W.

The truck carrying conveyor A5 has a trolley A8 guided and supported for traveling movement by and on guide rollers A7 which are rolled on a pair of guide rails A6 having a channel-shaped cross section and disposed in an opposing relationship to each other on the opposite left and right sides of the trolley A8.

The trolley A8 of the truck carrying conveyor A5 is connected to a conveyor chain A9 in such a manner as shown in FIG. 8 which is an enlarged sectional view taken along line A—A of FIG. 7. When the conveyor chain A9 is driven, a hauling member A11 formed from a pusher dog or the like on the truck carrying conveyor A5 side is removably engaged with a truck hauling engaging member A10 provided on the bottom face of the carrying truck A1 and projecting toward the floor to haul the truck hauling engaging member A10 to cause the carrying truck A1 to travel.

Meanwhile, FIG. 9 shows an example of a skid carrier for receiving a work W and carrying it in an oven. Referring to FIG. 9, the skid carrier is generally denoted at B1. A skid carrying roller conveyor B2 includes a support frame B3 located on a floor face, and a large number of flanged free rollers B4 arranged along a carrying direction at one of the opposite ends of the support frame B3 in a widthwise direction. A large number of drive rollers B5 are disposed at the other end portion of the support frame B3 in the widthwise direction in an opposing relationship to each of the flanged free rollers B4.

Each of the flanged free rollers B4 is mounted for free rotation around a horizontal axis and has a pair of flanges F formed on the opposite sides of an outer periphery thereof. Each of the flanged free rollers B4 thus guides, with the flanges F thereof, the opposite side faces of a roller contacting portion t provided at a bottom portion of one of a pair of skid legs B6 of the skid carrier B1, on which a work W is received, and receives, at the outer periphery thereof, the lower face of the roller contacting portion t.

Each of the drive rollers B5 receives, at an outer periphery thereof, the lower face of the roller contacting portion t of the other skid leg B6 of the skid carrier B1 so that the skid carrier B1 is carried by rotation of the drive roller B5.

In the conventional truck carrying conveyor A5 described above, such a cumbersome attaching method as to secure a lower portion of each rail A4 formed from an I-beam to a fixed side frame using a holding plate, a bolt, a nut and so forth must be adopted to attach the rails A4 to the fixed side frame. Further, the distance between the pair of rails A4 must be checked carefully to assure smooth carrying of the carrying truck A1 with reduced carrying noise. In short, a predetermined rail gauge must be observed using a ruler for the rail gauge frequently, and a heavy burden is imposed by construction and a high cost for construction is required.

Further, where the conventional truck carrying conveyor A5 is used, upon transfer from a track carrying conveyor A5 for a current step to another track carrying conveyor A5 for a next step, upon transfer between the truck carrying conveyor and a traverser for carrying to an orthogonal carrying line or upon transfer between a truck carrying conveyor and a lifter, the allowable track connection distance or the allowable track offset distance between the rails laid on the truck carrying conveyor, traverser and lifter is approximately 10 mm in the maximum particularly where such a work as a body of an automobile is carried. If this allowable distance is exceeded, then smooth transfer becomes difficult, and high transferring power is required and besides accidental dislocation of the traveling wheels from the rails may possibly occur. Therefore, a carrying line must be designed taking prevention of such accidental dislocation as described above sufficiently into consideration.

Furthermore, in order to prevent frame assembling and adjusting operation of the truck carrying conveyor A5 at a site of the carrying line, the frame is in most cases shipped after it is assembled by the manufacturer of the truck carrying conveyor A5. The assembled frame of the truck carrying conveyor A5 is bulky, and this gives rise to various problems in terms of the transporting medium, transporting efficiency, cost of transport and so forth.

Further, in the conventional truck carrying conveyor A5, since the hauling member A11 formed from a pusher dog or the like on the truck carrying conveyor A5 side is removably engaged with the truck hauling engaging member A10 provided on the bottom face of the carrying truck A1 and projecting toward the floor to haul the truck hauling engaging member A10 to cause the carrying truck A1 to travel, it is important to secure a tolerance with which reliable engagement and disengagement of them can be achieved. Consequently, a high degree of accuracy in production is required, and besides, there is a cumbersome problem that a working person must perform a desired operation carefully so that it may not be caught or held by the hauling member.

Furthermore, in the conventional truck carrying conveyor A5, since a plurality of hauling members A11 for engaging with a plurality of carrying trucks A1 are mounted on the single hauling conveyor chain A9 each through a trolley A8, if the length of the conveyor is changed because of modification to the carrying step or the like, it is necessary to cut the hauling conveyor chain A9 and add or remove a predetermined number of frame units. Consequently, there is a problem that a heavy burden is imposed by the changing operation. Besides, if a failure or the like occurs with a drive unit of the truck carrying conveyor A5, then the driving force is removed from the overall length of the conveyor, and there is a problem that much man-labor is required for a countermeasure operation against it.

On the other hand, since the skid carrier B1 which is carried by the conventional skid carrying roller conveyor B2 described hereinabove with reference to FIG.9 is produced with a weight as low as possible taking the carrying efficiency or the thermal efficiency when it is carried in a drying furnace with an automobile body after painted loaded thereon into consideration and besides it is usually formed in such an elongated shape that the length is 5 to 6 m and the width is approximately 800 mm, it is likely to be deflected by a load acting thereon and is liable to have deformation upon manufacture thereof.

Therefore, when the skid carrier B1 is carried by the skid carrying roller conveyor B2 described above, one of the drive rollers B5 which is opposed to the roller contacting portion t of the skid leg B6 is likely to be displaced out of contact with the roller contacting portion t of the skid leg B6 due to the deflection or the deformation of the skid leg B6. If such displacement occurs, then sufficient driving force is not transmitted from the drive roller B5 to the skid carrier B1, resulting in a problem of a drop of the carrying efficiency.

Particularly where the flanged free rollers B4 for guiding and supporting the roller contacting portion t of the skid leg B6 are disposed in series between two adjacent drive rollers B5, if the roller contacting portion t of the skid leg B6 contacts only with the flanged free rollers B4 and floats at the positions of the drive rollers B5, then there is the possibility that the skid carrier B1 may not be carried.

Therefore, the rollers which oppose to at least one of the skid legs B6 of the skid carrier B1 must all be the drive rollers B5. This gives rise to a problem that, if the number of drive rollers B5 increases, then the structure of the skid carrying roller conveyor B2 is complicated and the production cost is increased, and also that, when a working person approaches the skid carrying roller conveyor B2 and works there, the drive rollers 5 bother or make an obstacle.

SUMMARY OF THE INVENTION

It is an object of the present invention to provide a storage conveyor for a hybrid carrying truck wherein construction of a carrying line at a site can be achieved simply and at a low cost without precise construction and smooth carrying and easy transfer between adjacent carrying apparatus of different types from each other can be achieved.

It is another object of the present invention to provide a storage conveyor for a hybrid carrying truck which can transmit propelling force with certainty irrespective of upward and downward movements of the hybrid carrying truck and produces a comparatively small amount of carrying noise.

It is a further object of the present invention to provide a storage conveyor for a hybrid carrying truck which secures the safety in a working situation upon carrying by partitioning a carrying operation space and a carrying driving control space from each other and does not make a trouble to wiring and so forth of a constructed driving control system.

In order to attain the objects described above, according to the present invention, there is provided a storage conveyor for carrying a hybrid carrying truck which includes a pair of left and right skid members and two pairs of traveling wheels disposed at front and rear positions on the left and right sides thereof, comprising a plurality of conveyor units connected to each other in a carrying direction, each of the conveyor units including a pair of rails for contacting with the traveling wheels of the hybrid carrying truck, a standard-length connection beam member for connecting the pair of rails to each other in a spaced relationship by a predetermined distance from each other, and a drive roller apparatus securely mounted on the standard-length connection beam member for contacting with one or both of the skid members to transmit propelling force to the hybrid carrying truck.

The skid members of the hybrid carrying truck which is carried by the storage conveyor for a hybrid carrying track according to the present invention are a pair of left and right roller contacting members which are formed on the bottom face of the truck body and elongated in the carrying direction for contacting with the plurality of drive rollers disposed along the carrying line to carry the truck body. The skid members have a length in the carrying direction a little greater than or substantially equal to the length in the carrying direction of a work to be placed on and carried by the hybrid carrying truck.

Where the storage conveyor for a hybrid carrying truck carries a hybrid carrying truck, the traveling wheels at the front and rear positions on the left and right of the hybrid carrying truck support the weight of the truck body and are guided for traveling by and along the pair of rails, and one or both of the pair of skid members provided on the bottom face of the truck body are friction driven by the drive roller apparatus. Consequently, the hybrid carrying truck travels in a condition wherein the truck supporting force and the truck propelling force are individually allotted functionally.

With the storage conveyor for a hybrid carrying truck, since each of the conveyor units includes the pair of rails for contacting with the traveling wheels of the hybrid carrying truck and the standard-length connection beam member for connecting the pair of rails to each other in a spaced relationship by a predetermined distance from each other, when construction of a carrying line is performed at a site, a predetermined rail gauge can be secured using the standard-length connection member even if a ruler for the rail gauge is not used. Consequently, assembly and construction are simple and convenient, and a burden in construction is reduced and reduction in cost can be achieved.

Further, since the storage conveyor for a hybrid carrying truck can be assembled simply and conveniently at a site of construction of a carrying line, assembly by the manufacturer as in the case of a conventional storage conveyor need not be performed, and conveyor parts before assembly can be transported in a compact form. Consequently, the storage conveyor for a hybrid carrying truck can augment the transporting medium, transporting efficiency, cost of transport and so forth significantly.

Furthermore, with the storage conveyor for a hybrid carrying truck, since the plurality of conveyor units each including the pair of rails, the standard-length connection member and the drive roller apparatus are connected to each other in the carrying direction, the number of conveyor units can be adjusted arbitrarily. Consequently, free layout designing of a carrying line is allowed, and also upon maintenance such as repair, it is possible to replace the individual conveyor units independently of each other thereby to reduce the influence of the maintenance to be had on the entire conveyor.

Further, since each of the conveyor units of the storage conveyor for a hybrid carrying truck includes the pair of rails along which the traveling wheels of the hybrid carrying truck travel and the drive roller apparatus for contacting with one or both of the skid members to transmit propelling force to the hybrid carrying truck, while, upon transfer between the storage conveyor and a traverser for transfer to an orthogonal carrying line or upon transfer between the hybrid conveyor and a lifter, such construction accuracy is required with a conventional storage conveyor that the allowable track connection distance or the allowable track offset distance between them must be suppressed to approximately 10 mm in the maximum particularly where such a work as a body of an automobile is carried, smooth and reliable transfer can be achieved even if the construction accuracy is moderated significantly to approximately one third the overall length of the truck body (for example, where the overall length of the truck body is 4,000 mm, to approximately 1,300 mm).

Preferably, the drive roller apparatus includes a drive roller for contacting with the skid member and rotating around a horizontal axis to frictionally drive the skid member, a floating support frame mounted on the standard-length connection beam member for supporting the drive roller to move so that an outer circumferential face of the drive roller is brought into and out of contact with the skid member, and biasing means for biasing the floating support frame so that the outer circumferential face of the drive roller may be resiliently pressed against the skid member.

In the storage conveyor for a hybrid carrying truck, even if the vertical positions passed by the skid members of the hybrid carrying truck during carrying are fluctuated by deflection or deformation of the hybrid carrying truck, since the floating support frames on which the drive rollers are supported are displaced following up the skid members by the biasing force of the biasing means thereby to keep a condition wherein the drive rollers are normally pressed against the skid members, the frictional driving force of the drive rollers is transmitted with certainty to the hybrid carrying truck.

More particularly, since the drive roller apparatus provided in the storage conveyor for a hybrid carrying truck includes the drive roller for contacting with the skid member and rotating around the horizontal axis to frictionally drive the skid member, the floating support frame mounted so that the outer circumferential face of the drive roller is brought into and out of contact with the skid member, and the biasing means for biasing the floating support frame, propelling force can be transmitted with certainty to the hybrid carrying truck irrespective of upward and downward movements of the hybrid carrying truck, and the consumed power of the drive rollers can be reduced and a maximum propelling load efficiency can be exhibited with low propelling force.

Further, since the drive roller apparatus provided in the storage conveyor for a hybrid carrying truck includes the floating support frame on which the drive roller for contacting with the skid member and rotating around the horizontal axis to frictionally drive the skid member is mounted and the biasing means for biasing the floating support frame so that the outer circumferential face of the drive roller may be resiliently pressed against the skid member, smooth carrying with reduced carrying noise can be achieved. Besides, even if a hand, a foot, a jumper or the like of a working person is caught by the drive roller apparatus, it can be removed immediately, and the safety of the working person can be secured.

Preferably, the storage conveyor for a hybrid carrying truck further comprises a plurality of floor plates disposed and extending between the pair of rails and each having an opening through which the drive roller moves upwardly and downwardly.

With the storage conveyor for a hybrid carrying truck, the plurality of floor plates through each of which the drive roller moves upwardly and downwardly are disposed between the pair of rails and partition the space between the pair of rails upwardly and downwardly into a carrying working space and a carrying driving control space. Consequently, in the carrying driving control space, wires and so forth of the driving control system constructed freely do not bother the carrying working and are protected with certainty, and otherwise possible disconnection of a wiring line can be prevented. Meanwhile, in the carrying working space, since the drive rollers can be moved into and out of the carrying working space freely, a flat floor face is created, and augmentation in safety and workability can be achieved.

It is to be noted that the rails provided in the storage conveyor for a hybrid carrying truck according to the present invention may have any sectional shape only if it conforms with the shape of the travelling wheels provided on the hybrid carrying truck. Particularly where the traveling wheels provided on the hybrid carrying truck are flanged wheels, a steel member having a rectangular cross section, which is usually used for universal applications, is preferably used in order to reduce the cost for construction.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a vertical sectional view showing a conventional skid carrier and a skid carrying roller conveyor in a carrying condition.

DESCRIPTION OF THE PREFERRED EMBODIMENT

In the following, a storage conveyor for a hybrid carrying truck to which the present invention is applied is described with reference to the drawings. The storage conveyor for a hybrid carrying truck of the present embodiment receives an automobile body as a work and is used in a painting step for an automobile and so forth.

Figure 1:
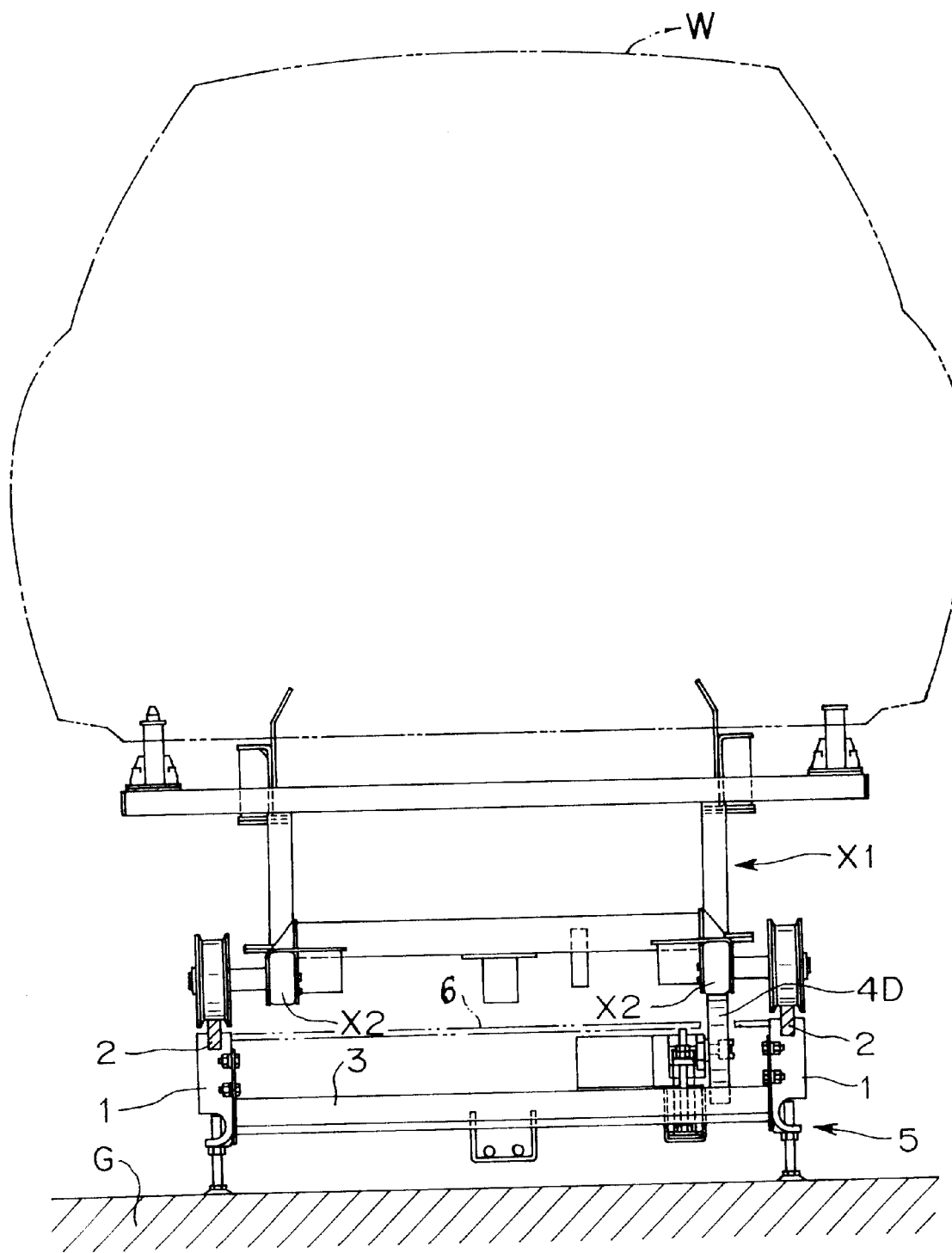
FIG. 1 is a vertical sectional view of a storage conveyor for a hybrid carrying truck to which the present invention is applied.
Figure 2:
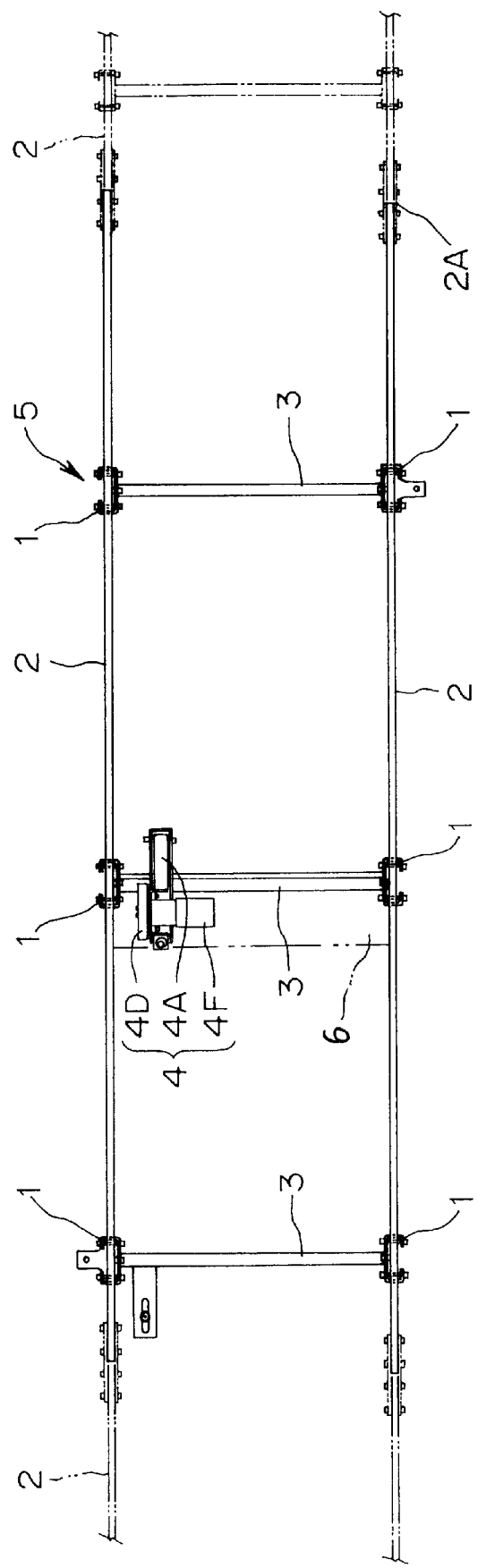
FIG. 2 is a plan view of the storage conveyor for a hybrid carrying truck.
Figure 3:
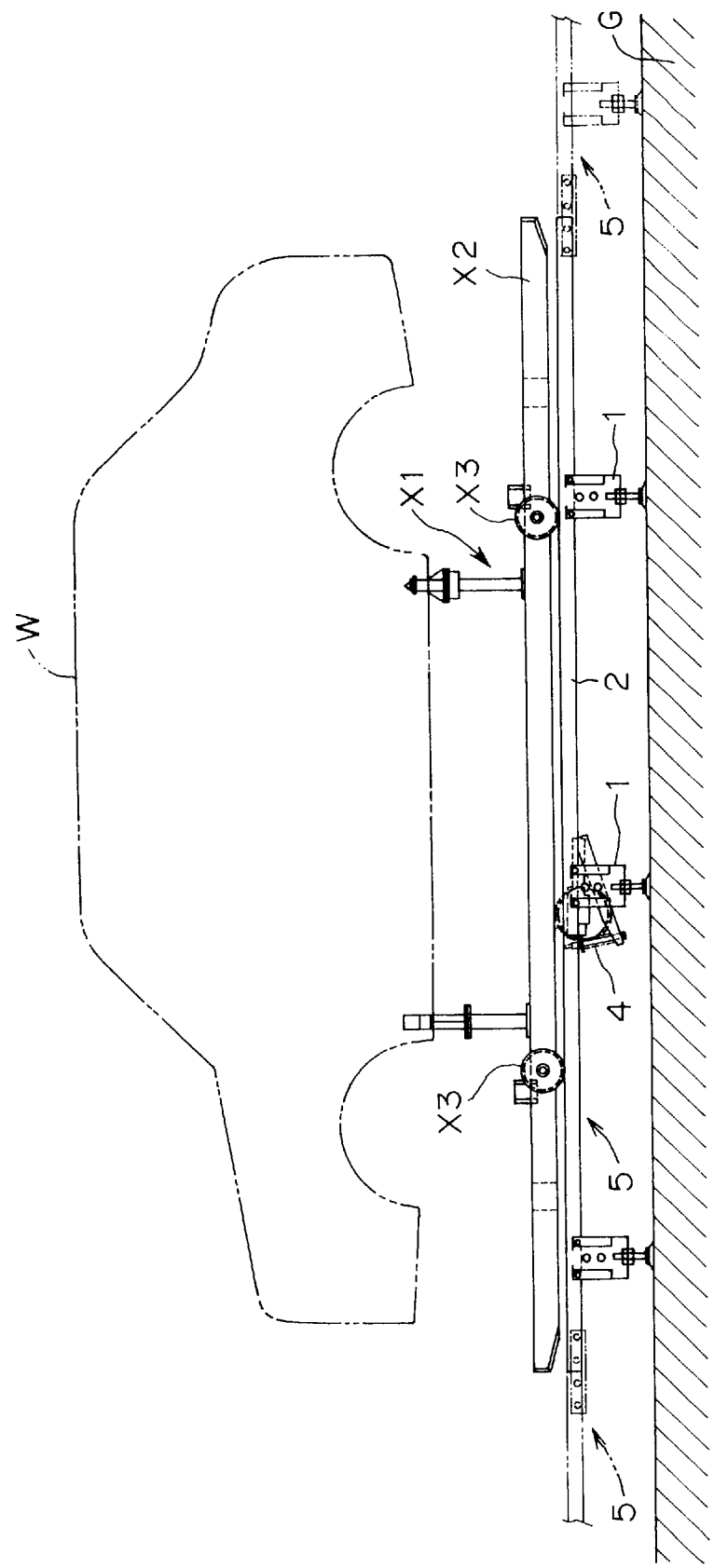
FIG. 3 is a side elevational view of the storage conveyor for a hybrid carrying truck.

Referring first to FIGS. 1 to 3, the storage conveyor for a hybrid carrying truck of the present embodiment includes a conveyor unit 5 which in turn includes a pair of rails 2 each supported by and extending between a large number of support brackets 1 disposed uprightly in a predetermined spaced relationship from each other along a carrying direction on a floor face G of a carrying path. The conveyor unit 5 further includes a large number of standard-length connection beam members 3 disposed in a spaced relationship by a predetermined distance from each other in the carrying direction and extending in a widthwise direction of the carrying path for interconnecting the pair of rails 2, and a drive roller apparatus 4 (FIGS. 2 and 3) provided for one of the standard-length connection beam members 3 for transmitting propelling force as a conveyor.

The pair of rails 2 used in the conveyor unit 5 may have any form only if they guide traveling wheels X3 (FIG. 3) provided on a hybrid carrying truck X1 for traveling. However, where a steel bar having a rectangular cross section which is universally used for various applications is used for the rails 2, reduction of the cost for construction can be anticipated.

A large number of such conveyor units 5 obtained in such a manner as described above are connected to each other to form a conveyor using a connection member 2A (FIG. 2) which connects those rails 2 which are contiguous to each other in the carrying direction.

Now, the drive roller apparatus 4 attached to the storage conveyor for a hybrid carrying truck according to the embodiment is described in detail.

Figure 4:
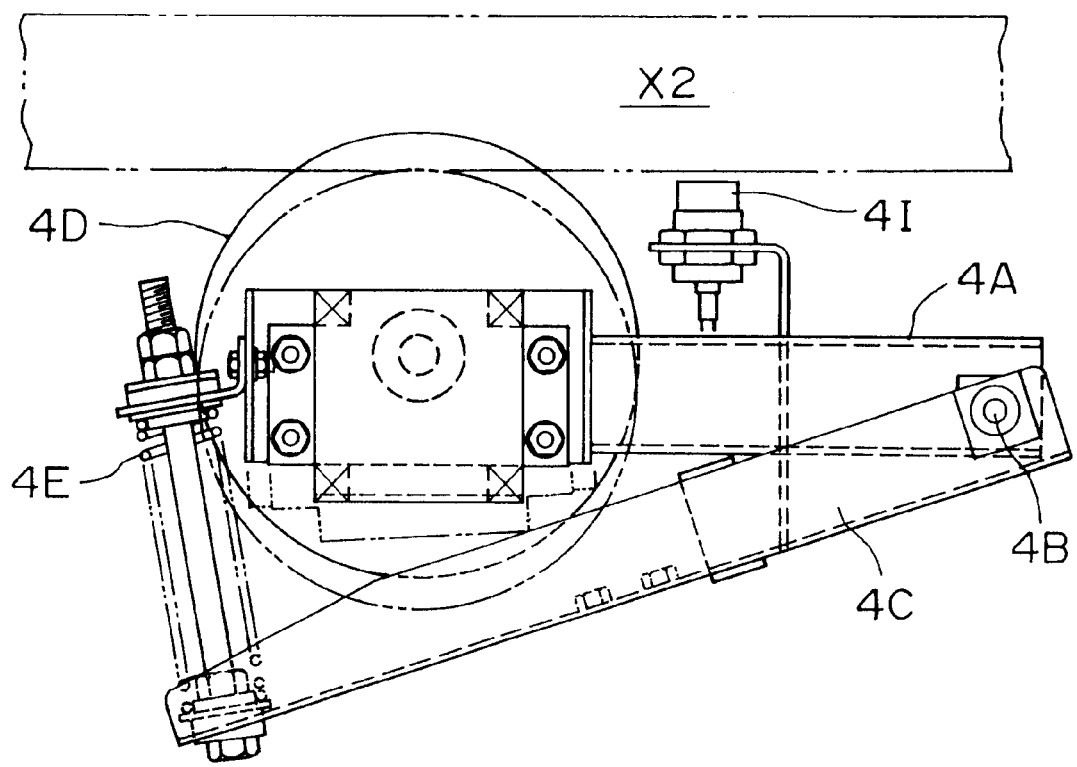
FIG. 4 is a side elevational view of a drive roller apparatus of the storage conveyor for a hybrid carrying truck.
Figure 5:
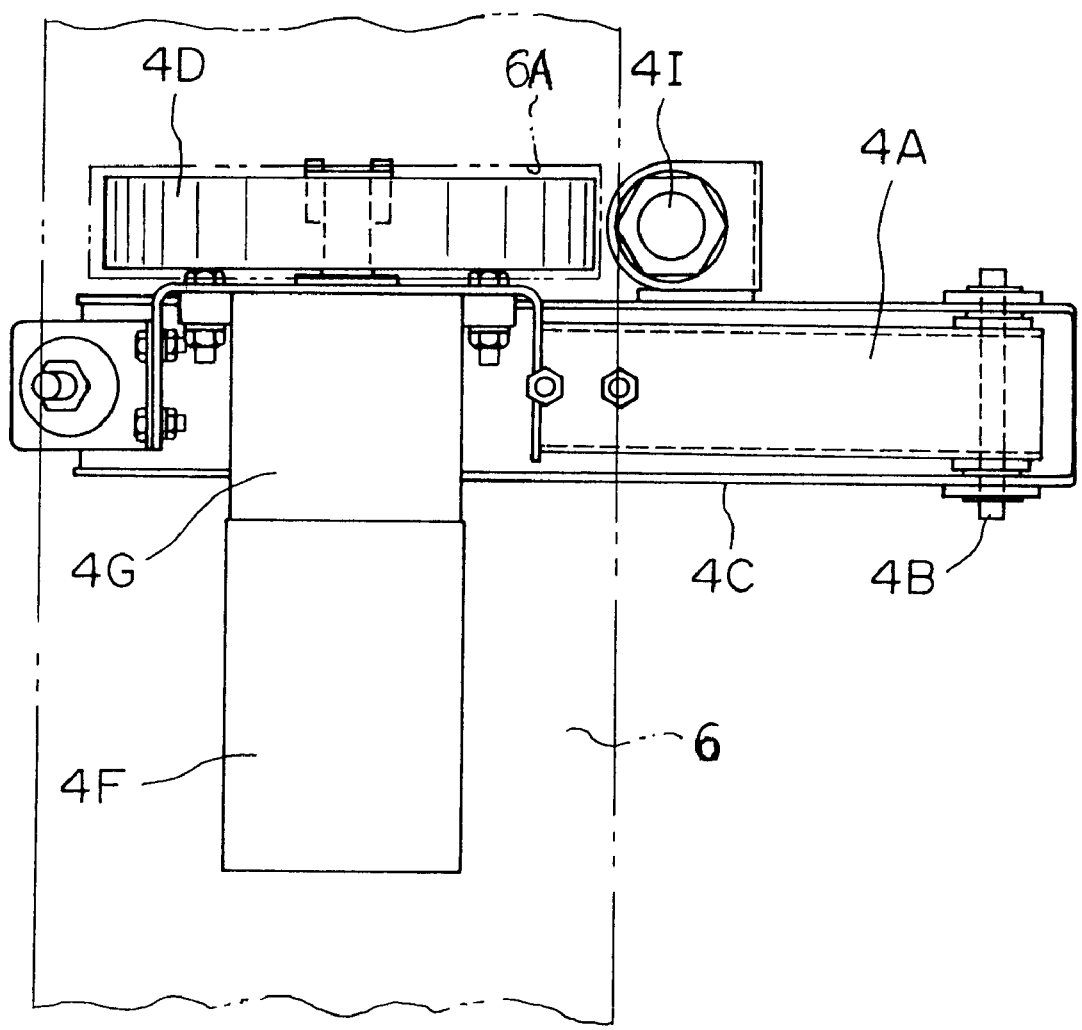
FIG. 5 is a plan view of the drive roller apparatus.
Figure 6:
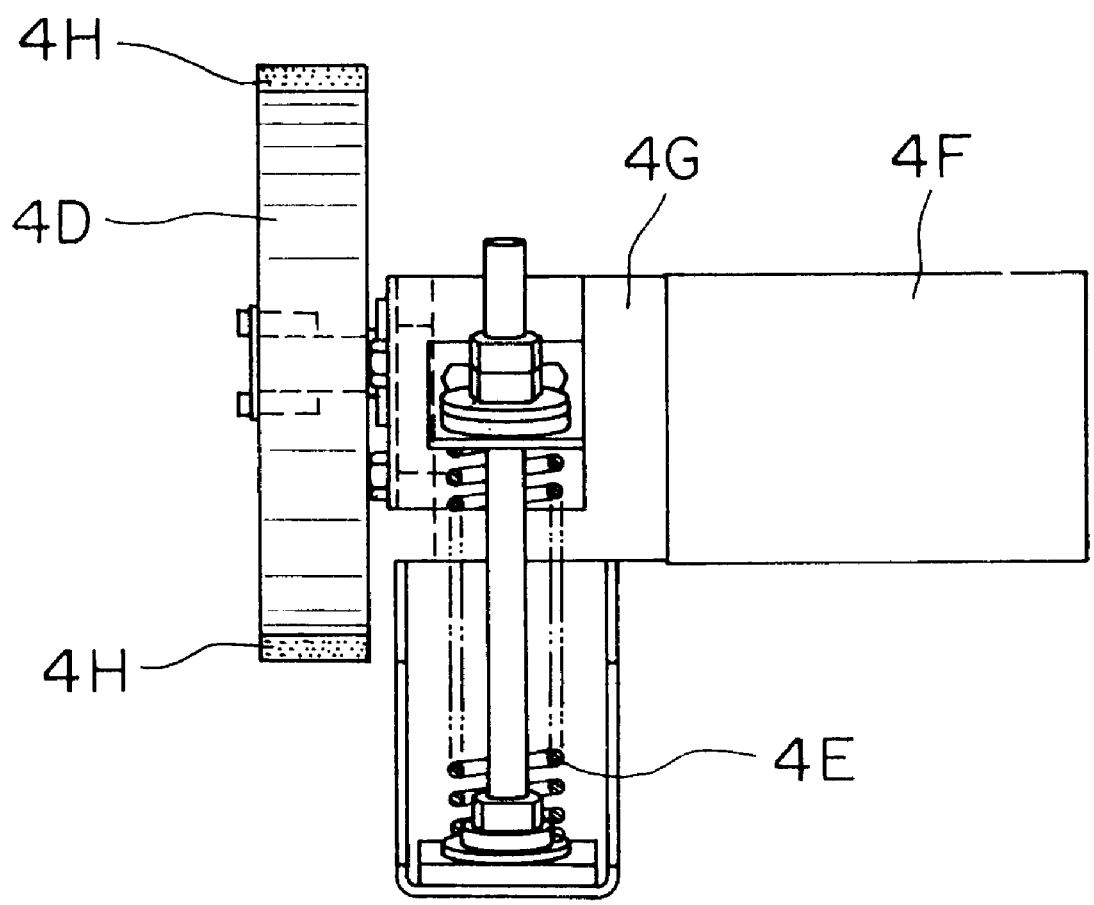
FIG. 6 is a view of the drive roller apparatus as viewed in a direction reverse to a carrying direction of the storage conveyor for a hybrid carrying truck.
Figure 7:
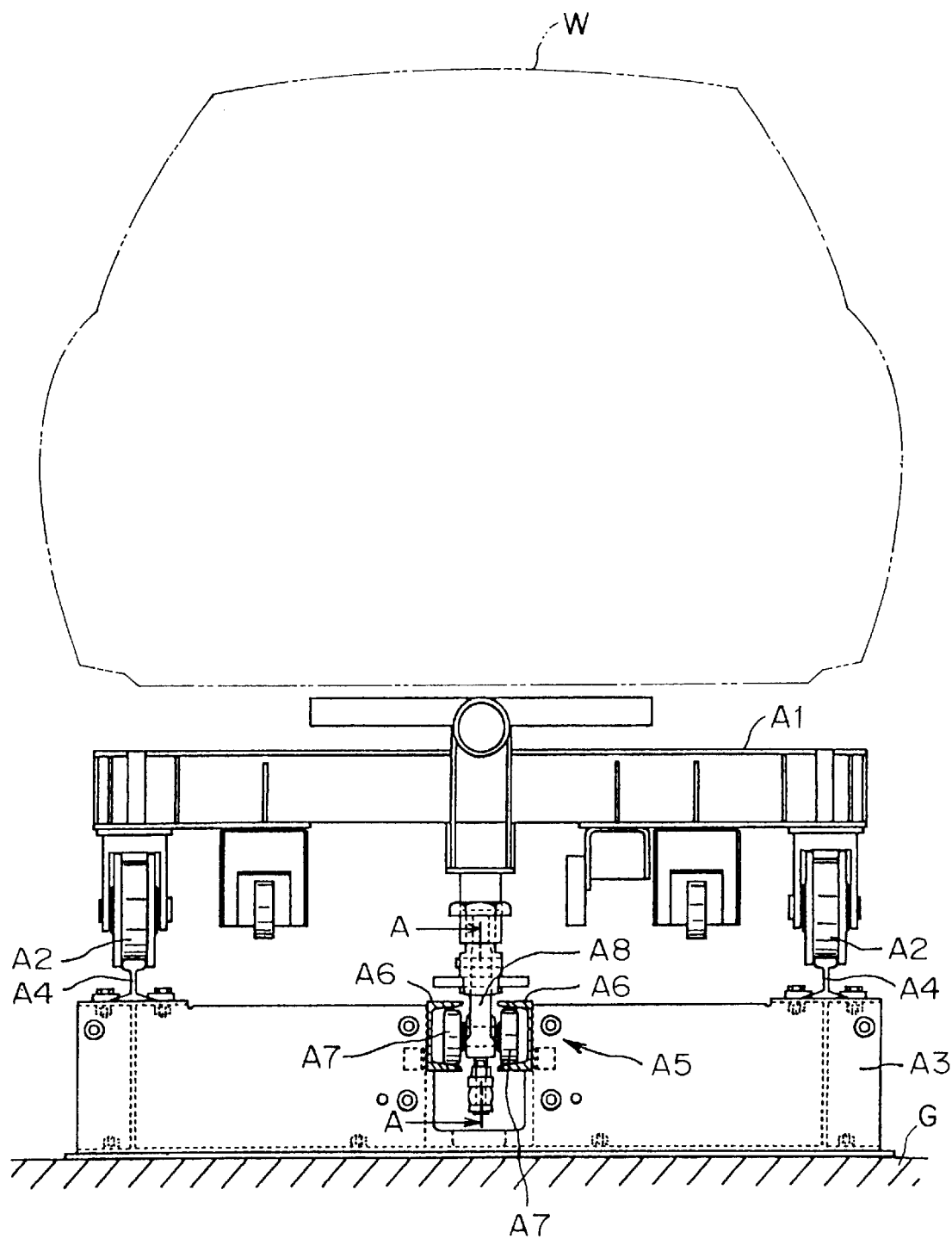
FIG. 7 is a vertical sectional view showing a conventional carrying truck and a truck carrying conveyor in a carrying condition.
Figure 8:
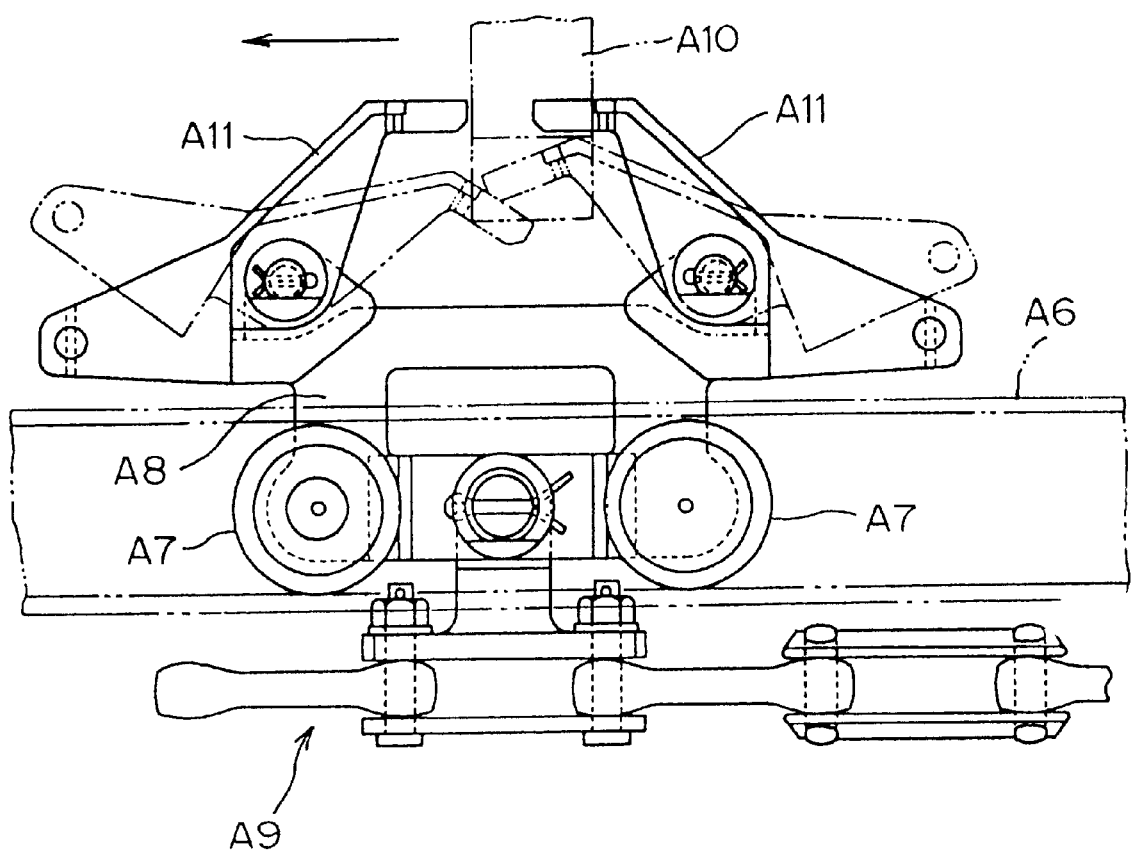
FIG. 8 is an enlarged sectional view taken along line A—A of FIG. 7 showing the carrying truck and the truck carrying conveyor in an engaging condition.

The drive roller apparatus 4 is provided at a position rather near to one end of the associated standard-length connection beam member 3. Referring to FIGS. 4 to 6, the drive roller apparatus 4 includes a mounting bracket 4A secured to an upper face of the standard-length connection beam member 3, and a floating support frame 4C supported on the mounting bracket 4A for upward and downward rocking motion by a rocking shaft 4B.

A drive roller 4D is mounted at a position of the floating support frame 4C forwardly of the rocking shaft 4B, and a biasing element composed of a compression coil spring 4E or the like is attached at an end thereof to a position of the floating support frame 4C forwardly of the drive roller 4D. The other end of the compression coil spring 4E is secured to a front position of the mounting bracket 4A.

A motor 4F and a speed reducer 4G, both shown in FIGS. 5 and 6, are built in the drive roller 4D such that the drive roller apparatus 4 is simple in structure and compact. However, the motor 4F and the speed reducer 4G for driving the drive roller 4D may alternatively be mounted on the floating support frame 4C or the like so as to drive the drive roller 4D from the outside.

Supply of power to the motor 4F built in the drive roller 4D is performed through a feeder line or cable not shown. Part of an outer circumferential surface of the drive roller 4D is coated with a resilient member 4H of urethane rubber or a like material having high friction.

When one of a pair of skid members X2 of the hybrid carrying truck X1 contacts with and is supported by the drive roller 4D, an outer circumferential surface of the resilient member 4H provided on the drive roller 4D is pressed against a lower face of the skid member X2 by the biasing force of the compression coil spring 4E.

When the drive roller 4D is driven to rotate in this condition, frictional force acts between the outer circumferential surface of the resilient member 4H and the skid member X2. Consequently, the hybrid carrying truck X1 can be propelled forwardly in the carrying direction.

It is to be noted that the drive rollers 4D of all of the conveyor units 5 may be driven to rotate continuously while a hybrid carrying truck X1 is carried, or alternatively, each of the drive rollers 4D may be driven only while a hybrid carrying truck X1 is detected by a truck detection sensor 4I (FIGS. 4 and 5) such as a photoelectric sensor or a contactless sensor provided on the rocking shaft 4B side of the mounting bracket 4A for detecting whether or not a hybrid carrying truck X1 is present above the drive roller 4D.

Further, while the storage conveyor for a hybrid carrying truck described above uses the compression coil spring 4E as the biasing element for the floating support frame 4C, the biasing element is not limited to this and, for example, a weight mounted on the floating support frame 4C for exerting a moment around the rocking shaft 4B or an air cylinder apparatus to which air of a fixed pressure is supplied may alternatively be used as the biasing element.

Furthermore, while the floating support frame 4C in the storage conveyor for a hybrid carrying truck described above is so structured as to be rocked around the rocking shaft 4B, it may have such an alternative structure that it is supported on the fixed member side through a linear guide mechanism or the like so that the drive roller 4D may be linearly moved toward and away from the skid member X2 of the hybrid carrying truck X1 and the drive roller 4D is pressed against the skid member X2 by a biasing element such as a compression spring.

Further, the storage conveyor for a hybrid carrying truck of the present embodiment includes a large number of floor plates 6 (one being indicated by phantom lines, for clarity, shown in FIGS. 1, 2 and 5) provided along the carrying path and extending between the pair of rails 2 such that they provide two vertically separated spaces, one being a carrying working space and the other being a carrying driving control space. Each of the floor plates 6 is formed from a steel plate and has an opening 6A (FIG. 5) which allows the drive roller 4D to move upwardly and downwardly through the opening 6A.

Since the drive roller 4D can move upwardly and downwardly trough the opening 6A formed in the pertaining floor plate 6 so as to allow such movement of the drive roller 4D, the safety of working is achieved.

In the storage conveyor for a hybrid carrying truck according to the embodiment of the present invention obtained in this manner, when a hybrid carrying truck X1 travels on the storage conveyor, the pair of rails 2 support the overall weight of the truck body of the hybrid carrying truck X1 through the traveling wheels X3 of the truck body and guide the hybrid carrying truck X1 for traveling, and a drive roller 4D friction drives the pair of skid member X2 provided on the bottom face of the truck body. Consequently, the hybrid carrying truck X1 travels in a condition wherein the truck supporting force and the truck propelling force are individually allotted functionally.

Accordingly, with the storage conveyor for a hybrid carrying truck of the present embodiment, construction of a carrying line at a site can be achieved simply at a low cost and smooth carrying with reduced carrying noise can be achieved, and besides the safety of a working situation upon carrying can be secured.

While a preferred embodiment of the present invention has been described using specific terms, such description is for illustrative purposes only, and it is to be understood that changes and variations may be made without departing from the spirit or scope of the following claims.

What is claimed is:

1. A storage conveyor for carrying a hybrid carrying truck, the truck including a pair of left and right skid members and two pairs of traveling wheels disposed at front and rear positions on the left and right sides of the truck, said storage conveyor comprising:

a plurality of conveyor units connected to each other in a carrying direction;

each of said conveyor units including a pair of rails disposed side-by-side for contacting with the two pairs of traveling wheels, respectively, of the hybrid carrying truck, a standard-length connection beam member extending transversely between said rails to interconnect the rails together in a transversely spaced relationship by a predetermined distance from each other, and a drive roller apparatus securely mounted on said standard-length connection beam member for rolling contact with one or both of the skid members to transmit propelling force to the hybrid carrying truck.

2. A storage conveyor according to claim 1, wherein said drive roller apparatus includes a drive roller for contacting with the skid member and rotating around a horizontal axis to frictionally drive the skid member, a floating support frame mounted on said standard-length connection beam member for supporting said drive roller to move so that an outer circumferential surface of said drive roller is brought into and out of contact with the skid member, and biasing means for biasing said floating support frame so that the outer circumferential surface of said drive roller may be resiliently pressed against the skid member.

3. A storage conveyor according to claim 2, further comprising a plurality of floor plates disposed and extending between said pair of rails and each having an opening through which said drive roller moves upwardly and downwardly.

4. A storage conveyor according to claim 1, in which said standard-length connection beam member is a first member, and further including a plurality of second standard-length connection beam members extending transversely between said rails to interconnect the rails together, said first member and said second standard-length connection beam members being spaced at equal intervals in said carrying direction.

5. A storage conveyor comprising a hybrid carrying truck and a plurality of conveyor units, in which:

the truck includes a pair of left and right skid members and two pairs of traveling wheels disposed at front and rear positions on the left and right sides of the truck; and the storage conveyor comprises a plurality of conveyor units connected to each other in a carrying direction;

each of said conveyor units including a pair of rails disposed side-by-side for contacting with the two pairs of traveling wheels, respectively, of the hybrid carrying truck, a standard-length connection beam member extending transversely between said rails to interconnect the rails together in a transversely spaced relationship by a predetermined distance from each other, and a drive roller apparatus securely mounted on said standard-length connection beam member for rolling contact with one or both of the skid members to transmit propelling force to the hybrid carrying truck.

* * * * *